(12) United States Patent
e Silva et al.

(10) Patent No.: US 11,876,829 B2
(45) Date of Patent: *Jan. 16, 2024

(54) METHOD FOR EMULATING A KNOWN ATTACK ON A TARGET COMPUTER NETWORK

(71) Applicant: AttackIQ, Inc., San Diego, CA (US)

(72) Inventors: Renan Fischer e Silva, Barcelona (ES); Albert López Fernández, San Diego, CA (US); Rajesh K. Sharma, San Diego, CA (US)

(73) Assignee: AttackIQ, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/087,360

(22) Filed: Dec. 22, 2022

(65) Prior Publication Data
US 2023/0137217 A1 May 4, 2023

Related U.S. Application Data

(63) Continuation of application No. 17/083,275, filed on Oct. 28, 2020, now Pat. No. 11,563,765.

(60) Provisional application No. 63/008,451, filed on Apr. 10, 2020.

(51) Int. Cl.
*H04L 9/40* (2022.01)
(52) U.S. Cl.
CPC ...... *H04L 63/1433* (2013.01); *H04L 63/1416* (2013.01); *H04L 63/1425* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 6,907,396 B1* | 6/2005 | Muttik | G06F 21/56 703/22 |
| 9,292,695 B1* | 3/2016 | Bassett | G06F 21/577 |
| 9,686,296 B1* | 6/2017 | Murchison | H04L 63/08 |
| 10,764,313 B1* | 9/2020 | Mushtaq | G06N 20/00 |
| 10,931,713 B1* | 2/2021 | Allam | H04L 63/1483 |
| 11,057,428 B1* | 7/2021 | Sellers | G06F 16/27 |

(Continued)

*Primary Examiner* — Kambiz Zand
*Assistant Examiner* — Mahabub S Ahmed
(74) *Attorney, Agent, or Firm* — Run8 Patent Group, LLC; Peter Miller; Brian T. Chew

(57) ABSTRACT

One variation of a method for emulating a known attack on a computer network includes: generating a set of data packets by recombining packet fragments within a packet capture file representing packet fragments transmitted between machines during a prior malicious attack on a second network; defining transmission triggers for transmission of the set of data packets between pairs of agents connected to a target network based on timestamps of packet fragments in the packet capture file; initiating transmission of the set of data packets between the pairs agents according to the set of transmission triggers to simulate the malicious attack on the target network; and, in response to absence of a security event related to the simulation in a log of a security technology deployed on the target network, generating a prompt to reconfigure the security technology to respond to the malicious attack.

20 Claims, 4 Drawing Sheets

(56) References Cited

U.S. PATENT DOCUMENTS

| | | | | |
|---|---|---|---|---|
| 2003/0208616 A1* | 11/2003 | Laing | ............... | H04L 63/1433 709/236 |
| 2006/0123480 A1* | 6/2006 | Oh | ............... | H04L 63/1408 726/23 |
| 2008/0109905 A1* | 5/2008 | Grosse | ............... | H04L 63/1458 726/23 |
| 2008/0271146 A1* | 10/2008 | Rooney | ............... | H04L 63/1425 726/23 |
| 2008/0289039 A1* | 11/2008 | Rits | ............... | H04L 63/123 726/22 |
| 2009/0044270 A1* | 2/2009 | Shelly | ............... | H04L 63/02 726/22 |
| 2010/0325412 A1* | 12/2010 | Norrman | ............... | G06Q 10/06 726/25 |
| 2011/0185432 A1* | 7/2011 | Sandoval | ............... | H04L 63/1433 726/25 |
| 2012/0144476 A1* | 6/2012 | McClure | ............... | H04L 63/1433 370/254 |
| 2014/0325634 A1* | 10/2014 | Iekel-Johnson | ............... | H04L 63/101 726/13 |
| 2015/0295948 A1* | 10/2015 | Hassell | ............... | H04L 63/1441 726/25 |
| 2016/0285907 A1* | 9/2016 | Nguyen | ............... | H04L 63/1433 |
| 2017/0134400 A1* | 5/2017 | Nguyen | ............... | H04L 63/1416 |
| 2017/0339187 A1* | 11/2017 | Papamartzivanos | ... | G06N 3/126 |
| 2018/0139224 A1* | 5/2018 | Arnell | ............... | H04L 61/4511 |
| 2018/0307833 A1* | 10/2018 | Noeth | ............... | H04L 63/1425 |
| 2019/0258782 A1* | 8/2019 | Lerner | ............... | G07C 9/257 |
| 2019/0281082 A1* | 9/2019 | Carmichael | ............... | G06F 21/577 |
| 2020/0313847 A1* | 10/2020 | Plusquellic | ............... | H04L 9/0631 |
| 2021/0035116 A1* | 2/2021 | Berrington | ............... | G06N 5/04 |
| 2021/0089647 A1* | 3/2021 | Suwad | ............... | G06F 21/552 |

\* cited by examiner

S100

| Assessments | | | | | | | |
|---|---|---|---|---|---|---|---|
| FILTER BY [All Available Assessments ▼] Showing 2 of 2 results | | | | | | | |
| 🔍 prevent| | | | | | | | [CREATE NEW ASSESSMENT] |

| TITLE ◆ | CREATOR | TEMPLATE | CREATED◆ | LAST ACTIVITY◆ | PREVENTION | DETECTION | ACTIONS |
|---|---|---|---|---|---|---|---|
| PCAP Replay-Prevented | ®renan.fischer@attackiq.com | Custom | 04/16/2020 06:08 PM | 04/16/2020 06:10 PM | ▭ | ▨▨▨ | ⋮ |
| PCAP Replay-Not Prevented | ®renan.fischer@attackiq.com | Custom | 04/03/2020 03:43 PM | 04/16/2020 06:08 PM | ▨▨▨ | ▨▨▨ | ⋮ |

S172 / S170

PCAP Replay [ATTACK] ⓘ   S170
[Firewall] [IDS/IPS] [Content Filtering] [Advanced Endpoint Detection] [Threat] [Network] [NGFW] [PCAP]

| Prevention Overall | Detection Overall | Phases | Role | Asset | Installed Technology | IP Address | Operating System |
|---|---|---|---|---|---|---|---|
| [PREVENTED] | [NOT DETECTED] | 19 | CLIENT | cyl10-1902 | no technology detected | 172.16.4.101 | Windows 10 Pro N |

S172

[NOT DETECTED] Replay Conversation As Client [CRITICAL] ⓘ    START TIME: 06:09:49 PM ON APR 16 2020
                                                              END TIME: 06:09:50 PM ON APR 16 2020 ⌄

Detailed Findings:
Conversation successfully replayed with asset 172.16.7.214 on port 80.

≡ ACTIVITY DETAILS                                       >
♀ MITIGATION RECOMMENDATIONS                             >
👁 DETECTION DETAILS                                     >
👁 INDICATORS OF COMPROMISE (IOCS) DETAILS               >

◊ [NGFW]

[PREVENTED] Replay Conversation As Client [CRITICAL] ⓘ
≡ ACTIVITY DETAILS

⊨ (04/16/2020 06:09:53) Socket successfully opened on local asset - ready as connect with remote asset.
⊨ (04/16/2020 06:09:54) Successfully connect to remote asset 172.16.7.214 on port 443.
△ (04/16/2020 06:09:54) Error receiving stream from remote endpoint.
⊨ (04/16/2020 06:09:54) Phase will be marked as prevented.                  ← S172
⊨ (04/16/2020 06:09:54) Fail to employ commendation between assets.

METHOD FOR EMULATING A KNOWN ATTACK ON A TARGET COMPUTER NETWORK

CROSS-REFERENCE TO RELATED APPLICATIONS

This Application is a continuation of U.S. Non-Provisional application Ser. No. 17/083,275, filed on 28 Oct. 2020, which claims the benefit of U.S. Provisional Application No. 63/008,451, filed on 10 Apr. 2020, each of which is incorporated in its entirety by this reference.

TECHNICAL FIELD

This invention relates generally to the field of internet security and more specifically to a new and useful method for emulating a known attack on a target computer network in the field of internet security.

BRIEF DESCRIPTION OF THE FIGURES

FIG. 2 is a graphical representation of one variation of the method;

FIG. 4 is a graphical representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
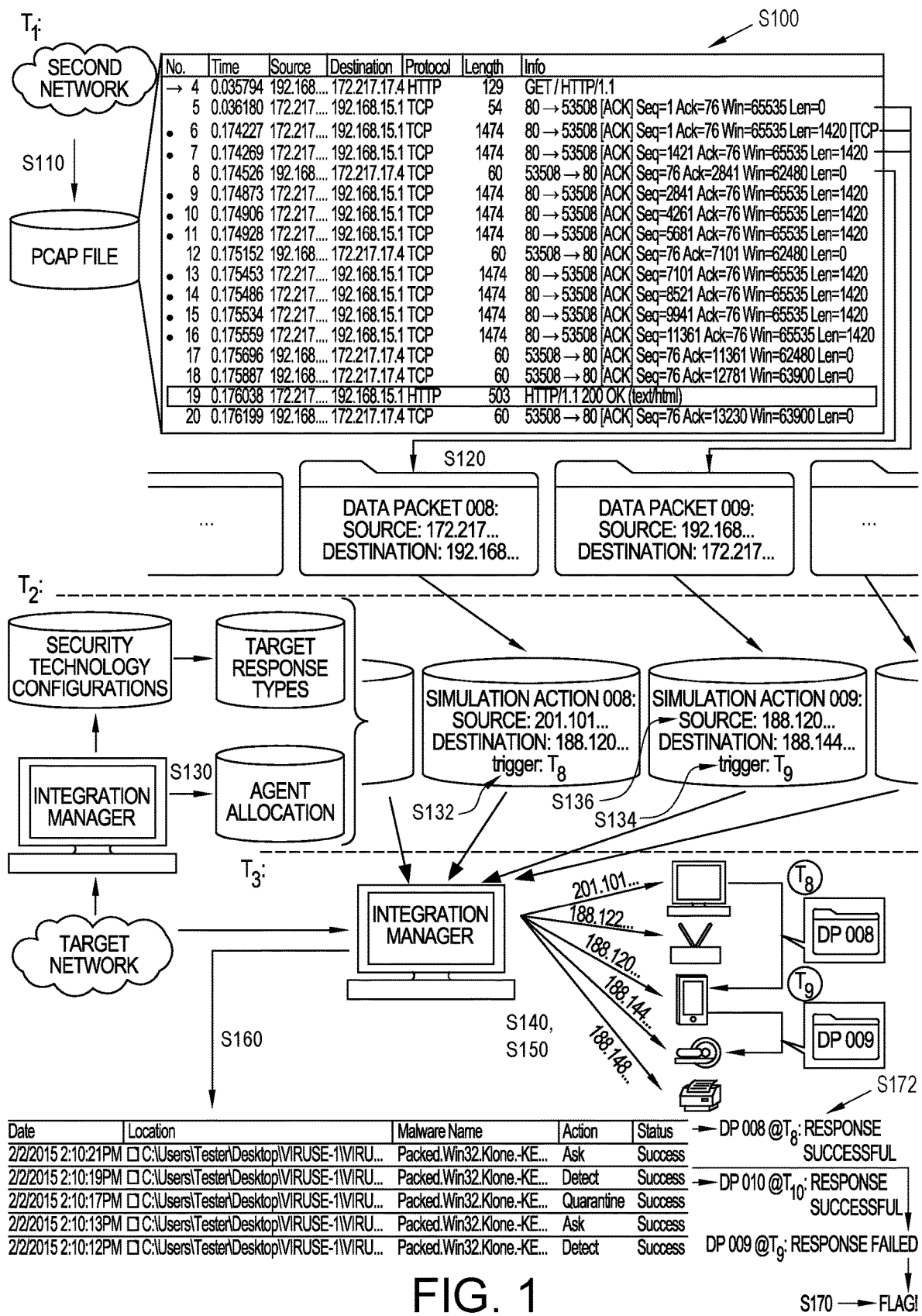
FIG. 1 is a flowchart representation of a method.

As shown in FIG. 1, a method S100 for emulating a known attack on a computer network includes: accessing a packet capture (or "PCAP") file representing packet fragments transmitted between machines within and external to a second network during a malicious attack on the second network during a first time period in Block S110; recombining packet fragments within the PCAP file based on packet fragment metadata to generate a set of data packets in Block S120; designating a set of agents installed on assets, within and external to a target network, as actors in a simulation of the malicious attack on the target network in Block S130. The method S100 also includes, for each data packet in the set of data packets: defining a transmission trigger, in a set of transmission triggers, for the data packet based on timestamps of corresponding packet fragments in the PCAP file in Block S132; designating a recipient agent, in the set of agents, to receive the data packet in Block S134; designating a source agent, in the set of agents, to transmit the data packet to the recipient agent according to the transmission trigger in Block S136; and uploading the data packet to the source agent for storage in local memory during a second time period succeeding the first time period in Block S140. The method S100 further includes: during a third time period succeeding the second time period, initiating transmission of the set of data packets from source agents to recipient agents, in the set of agents, according to the set of transmission triggers to simulate the malicious attack on the target network in Block S150; scanning a log of a security technology, deployed on the target network, for a security event related to the simulation in Block S160; and in response to absence of the security event in the log, generating a prompt to reconfigure the security technology to respond to the malicious attack in Block S170.

Figure 3:
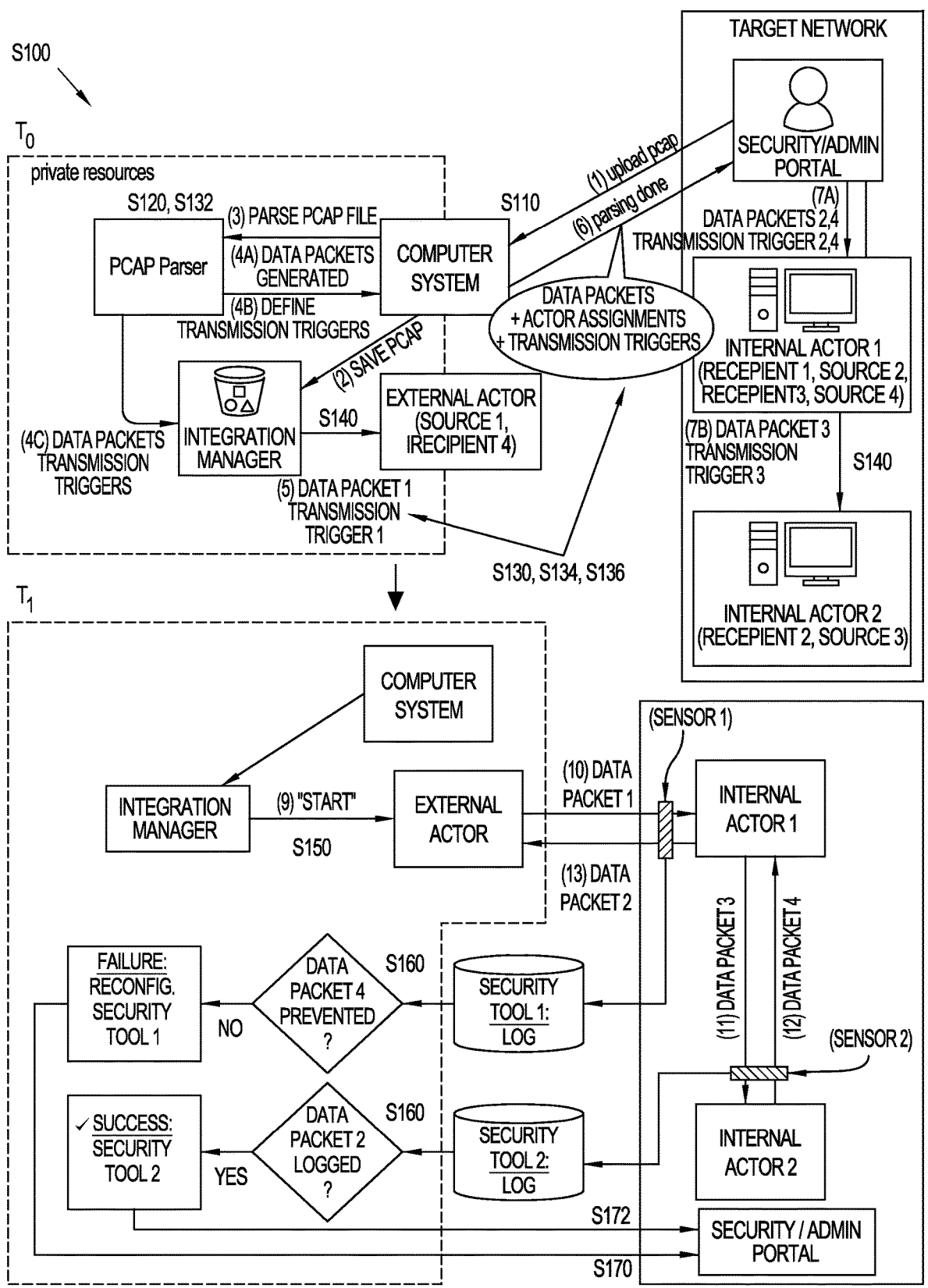
FIG. 3 is a flowchart representation of one variation of the method.

One variation of the method S100 shown in FIG. 3 includes: scanning a log of a security technology, deployed on the target network, for a first security event related to a first data packet in the set of data packets and for a second security event related to a second data packet in the set of data packets in Block S160; in response to presence of the first security event in the log, confirming configuration of the security technology to respond to a first stage of the malicious attack corresponding to the first data packet in Block S172; and, in response to absence of the second security event in the log, generating a prompt to reconfigure the security technology to respond to a second stage of the malicious attack corresponding to the second data packet in Block S170.

A similar variation of the method S100 includes: scanning a first log of a first security technology, deployed on the target network, for a first security event related to a first data packet in the set of data packets in Block S160; in response to presence of the first security event in the first log, confirming configuration of the first security technology to respond to a first stage of the malicious attack corresponding to the first data packet in Block S172; scanning a second log of a second security technology, deployed on the target network, for a second security event related to a second data packet in the set of data packets in Block S160; and, in response to absence of the second security event in the second log, generating a prompt to reconfigure the second security technology to respond to a second stage of the malicious attack corresponding to the second data packet in Block S110.

2. Applications

Generally, a computer system can execute Blocks of the method S100: to access a PCAP file containing packet fragments transmitted between machines within the second network and representative of bandwidth and other characteristics of the second network during a previous attack on the second network; and to recombine data fragments in this PCAP file to form a set of data packets representative of original "conversations" between these machines during the previous attack. The computer system can then: designate source and destination agents—installed on assets (e.g., servers, switches, printers, computers, smartphones) within and outside of the target network but not configured to execute commands or extract other data contained within these data packets—to send and receive these data packets during an attack simulation on the target network based on source and destination addresses of machines associated with corresponding data fragments in the PCAP file; generate a simulation schedule for transmission of these data packets between these source and destination agents based on timestamps of corresponding data fragments represented in the PCAP file; initiate an attack simulation in which designated source agents transmit assigned data packets to designated destination agents according to the simulation schedule; and monitor security technologies installed on the target network for detection, prevention, and/or alert events in response to this simulation. The computer system can then verify whether these security technologies deployed on the target network are properly configured to respond to an authentic analogous attack on the target network based on whether these security technologies generated detection, prevention, or alert events related to these data packets during this simulation.

In particular, merely triggering assets on the target network to transmit and receive data fragments recorded in the PCAP file during the previous attack on the second network: may fail to represent traffic, bandwidth, and configuration differences between the target network and the second network; and may thus fail to accurately depict exploitation of the target network according to the attack such that success or failure of security technologies—deployed on the target network—to detect, prevent, or alert on these data fragments may not be predictive of whether these security technologies are properly configured to detect, prevent, or alert on this attack occurring on the target network.

Therefore, the computer system can: reconstruct an authentic attack "conversation" from this previous attack on the second network by reassembling data fragments—stored in the PCAP file—into complete data packets; and then replay this attack "conversation" by coordinating transmission of these data packets between two agents (or "actors") within and/or outside of the target network during an attack simulation. The computer system can also construct multiple concurrent and/or serial "conversations" between multiple pairs of internal and/or external agents from this PCAP file and coordinate the conversations accordingly. These agents may then: re-fragment these data packets based on real-time network traffic and network and asset configurations; and transmit these packet fragments—that differ in payload, etc. from analogous packet fragments transmitted between machines on the second network during the previous attack—to corresponding agents during the attack simulation, thereby creating an authentic, innocuous facsimile of the attack occurring on the target network.

For example, the computer system can reconstruct actual data—such as including commands and files—distributed between machines internal and external to the second network during the previous attack on the second network to form a set of discrete data packets. The computer system can then configure an attack simulation on the target network by: allocating a set of agents—installed on assets internal and external to the target network—send and receive these data packets in order to reproduce the previous attack on the target network based on unique IP (and/or MAC) addresses of machines internal and external to the second network that were involved in the previous attack on the second network, as represented in the PCAP file; defining an attack simulation schedule (or a set of time- or action-based "triggers") for transmission of these data packets between these agents based on timestamps of packet fragments—containing analogous data—sent between machines internal and external to the second network during the attack on the second network, as represented in the PCAP file; and then coordinate these agents to send and receive these data packets according to this attack simulation schedule during an attack simulation on the target network. In this example, when a source agent within the target network (i.e., an "internal source agent") transmits an assigned data packet to a designated destination agent within the target network (i.e., an "internal destination agent") according to the attack simulation schedule, the source agent may necessarily transmit actual data that was transferred between two machines within the second network during the previous attack on the second network. This "simulation action" between the source and destination agents may therefore represent an authentic recreation of an analogous interaction between the two machines within the second network during the previous attack.

Thus, rather than fabricate or contrive data for transmission between assets on the target network in order to verify that security technologies and configurations on the target network, the computer system can instead coordinate an attack simulation in which agents—within and external to the target network—send and receive data packets that are identical in essence to data (e.g., commands, files) transferred between machines during the attack on the second network. Accordingly, this attack simulation generates network traffic on the target network that is authentic and representative of real network traffic that might occur on the target network during such a similar real attack on the target network. Detection, prevention, and/or alerting events generated by security technologies deployed on the target network responsive to the attack simulation generally or to individual simulation actions within the attack simulation may therefore accurately predict whether these security technologies are currently configured to respond to a similar real attack on the target network.

Furthermore, each agent allocated for the attack simulation may be configured to: receive a data packet from another agent according to a simulation action; and execute a next simulation action (e.g., by sending a next data packet to another agent) according to the attack simulation schedule; but not to execute commands contained within data packets received from another agent during the attack simulation, thereby preventing incidental execution of malicious actions—from the original attack—on the target network. For example, the computer system can compile a set of packet fragments stored within the PCAP file into a data packet that contains a command to open a particular port on a machine involved in the attack on the second network. During the attack simulation, a first agent sends this data packet—such as in the form of one or more packet fragments—to a second agent within the target network. However, the second agent is not configured to read inbound data packets, to extract commands from inbound data packets, or otherwise respond to commands within data packets inbound from other agents during the attack simulation. Therefore, while this data packet represents an authentic communication between two machines during the attack on the second network, a command or other malicious data contained within this data packet remains innocuous and inoperable at the agent as a function of the configuration of the agent.

Furthermore, because these agents on the target network are not configured to extract and respond to commands contained in data packets within the attack simulation, the computer system can avoid verifying that an agent scheduled to receive a data packet within the attack simulation is executing on an asset of the same type, supporting the same port configurations, and/or supporting the same actions, etc. as the machine on the second network that received and responded to this same data packet during the attack on the second network. Such configuration of these agents within and external to the target network can thereby enable the computer system to: configure the attack simulation with greater flexibility; generate and run multiple (or many) instances of the attack simulation with different combinations of agents sending and receiving these data packets; and thus verify that security technologies are configured to respond to a real, analogous attack throughout multiple (or many) different regions of the target network and by exploiting different types of assets in different regions of the target network.

2.1 Command-and-Control

Generally, the method S100 is described herein as executed by a computer system, an integration manager, and/or a set of internal agents installed on assets within the target network to simulate—on the target network—north-south network traffic representative of a previous command-and-control attack on another, different network.

However, the method S100 can additionally or alternatively be executed to simulate—on the target network—north-south and/or east-west network traffic representative of a previous data-leak or command-and-control attack on another, different network or on the target network itself.

2.2 Terms

A "second network" is referred to herein as a computer network that was previously subject to a malicious attack, such as a command-and-control or data-leak attack.

A "machine" is referred to herein as a computing device—such as a server, a router, a printer, a desktop computer, or a smartphone—within or connected to the second network and that was involved in the malicious attack.

A "packet capture file" (hereinafter a "PCAP file") is referred to herein as a data file containing packet fragments interchanged between two machines—such as between two machines inside the second network or between one machine internal to the second computer network and a second machine outside of the second network—during the malicious attack on the second network. For example, an application programming interface installed on or interfacing with the second network can capture packet fragments transmitted between machines internal and external to the second network and related metadata during the malicious attack. The application programming interface can also capture metadata representative of these packet fragments, such as including: transmit times (or "timestamps"); source machine identifiers (e.g., IP or MAC addresses); destination machine identifiers; protocols (e.g., TCP, HTTP); packet payloads (or "lengths"); source and destination ports; request types (e.g., file requests, connection initiation and termination requests); and/or request response types (e.g., requests confirmed, requests denied, files sent). A security analyst or computer system can then filter these packet fragments to remove packet fragments not related (or unlikely to be related) to the malicious attack. The application programming interface (or the computer system, etc.) can then compile the remaining packet fragments and metadata into the PCAP file that represents the malicious attack on the second network.

A "target network" is referred to herein as a computer network on which the malicious attack is simulated by "replaying" the PCAP file—according to Blocks of the method S100—in order to verify that security technologies deployed on the target network are configured to respond to (e.g., detect, prevent, or alert on) analogous attacks.

An "asset" is referred to herein as a computing device—such as a server, a router, a printer, a desktop computer, or a smartphone—within or connected to the target network.

An "internal agent" is referred to herein as an asset—within the target network—loaded with attack simulation software and thus configured to execute steps of attack simulations on the target network. Similarly, an "external agent" is referred to herein as an asset—external to the target network (e.g., a remote server)—loaded with attack simulation software and thus configured to execute steps of attack simulations on the target network.

An "actor" is referred to herein as an internal or external agent selected—such as automatically by the computer system or manually by security personnel—to execute a step of a particular attack simulation on the target network, such as by transmitting a data packet to another actor or receiving a data packet from another actor.

An "attack simulation" is described herein as a coordinated, time- or action-based interchange of data packets, derived from the PCAP file, between actors within and external to the target network to simulate the malicious attack—that previously occurred on the second network—on the target network.

A "simulation action" is described herein as a step or "stage" of an attack simulation in which a data packet is transferred from a source agent to a recipient agent according to a time- or action-based trigger derived from the PCAP file.

3. System

As shown in FIG. 3, the computer system can interface with (or includes): an integration manager; a set of internal agents installed on assets (or "machines") within the target network; and an external agent(s) installed on an asset outside of the target network.

3.1 Integration Manager

In one implementation, when the method S100 is enabled on the target network, an administrator or other affiliate of the target network: installs an instance of an integration manager on a machine within the target network; and supplies login information or other credentials for security technologies (e.g., direct and aggregate network threat management systems) installed or enabled across the target network or at particular assets within the target network. The integration manager can then: load plugins for these security technologies; automatically enter login information or other credentials supplied by the administrator in order to gain access to event logs generated by these security technologies responsive to activity detected on the target network; and retrieve current settings and configurations of these security technologies within the target network, such as whether these security technologies are active and whether active security technologies are configured to detect, prevent, or alert on certain network activities or attacks more generally.

Later, the integration manager can execute Blocks of the method S100 to define, configure, schedule, and then coordinate simulation actions within the attack simulation on the target network.

3.2 Internal Agent

The computer system also coordinates execution of simulation actions by internal agents within the target network during the attack simulation.

In one implementation, an internal agent includes an asset (e.g., an internal server, a printer, a desktop computer, a smartphone, a router, a network switch): within the target network; and loaded with an attack simulation software configured to send and receive data packets according to simulation actions within an attack simulation generated by the computer system.

In particular, an internal agent can: load a data packet generated from a set of packet fragments extracted from the PCAP file and corresponding to a simulation action; detect or receive a trigger, such as receipt of a command from the integration manager, receipt of a data packet from another internal or external agent, or expiration of an internal timer; and then transfer the data packet—such as in its entirety or over a sequence of packet fragments based on real-time traffic, bandwidth, and configuration of the target network—to a designated destination agent within or external to the target network according to the simulation schedule.

3.3 External Agent

Similarly, the computer system coordinates execution of simulation actions by external agents outside of the target network during the attack simulation.

In one implementation, an external agent includes an asset (e.g., an external server): outside of the target network; loaded with the attack simulation software; and configured to simulate a malicious external actor during a network attack.

4. PCAP File

Block S110 of the method S100 recites accessing a PCAP file representing packet fragments transmitted between machines within and external to a second network during a attack on the second network during a first time period. Generally, in Block S110, the computer system can access a PCAP file generated during a attack on the second network according to full packet capture (or "FPC") techniques. More specifically, in Block S110, the computer system can access a PCAP file that includes a population of packet fragments that represent packet interchanges between hosts (e.g., "machines") within and external to the second network during the malicious attack on the second network at an earlier time.

For example, an attack on the second network may generate network traffic between machines inside of the second network and a machine outside of the second network (e.g., a malicious external actor). A PCAP file generated during this attack may thus contain actual packet fragments transmitted between these internal machines and the external machine during the attack. The PCAP file may also contain metadata representative of each packet fragment, such as including: a transmit time (or "timestamp"); a source machine identifier (e.g., an IP or MAC address); a destination machine identifier (e.g., an IP or MAC address); a protocol (e.g., TCP, HTTP); a packet payload (or "length"); source and destination ports; a request type (e.g., file requests, connection initiation and termination requests); and/or a request response type (e.g., request confirmed, request denied, file sent).

In particular, the PCAP file may include a set of packet fragments that together represent a single data packet—sent from a source machine to a destination machine during the attack on the second network—containing a command, a request, or a file. The payload (i.e., the size, the length) of an individual packet fragment represented in the PCAP file may be a function of real-time network traffic, network bandwidth, and/or network configuration, etc. at the second network when the corresponding source machine transmitted the packet fragment to a corresponding destination machine. Therefore, transmission of this data packet within, to, or out of the second network at a particular time during the attack may be unique to the second network at this particular time.

In one implementation, after the attack is detected on the second network and characterized, such as by an external security technology, the computer system (or a supplier of the PCAP file) can: estimate a time period of the attack on the second network; access a global PCAP file representing traffic on the second network over time; extract a subset of packet fragments associated with timestamps that intersect the time period of the attack; filter this subset of packet fragments by source and destination machines that were and/or that may have been involved in the attack; and aggregate these packet fragments and related metadata in a PCAP file for the attack. The computer system can then retrieve this PCAP file in Block S110.

5. Data Packet Reconstruction

Block S120 of the method S100 recites recombining packet fragments within the PCAP file based on packet fragment metadata to generate a set of discrete data packets. Generally, in Block S120, the computer system can recombine packet fragments contained within the PCAP file to generate a sequence of complete, discrete data packets that were transferred between machines—internal and external to the second network—during the attack on the second network. In particular, the computer system can group discrete packet fragments by: source machine identifiers; destination machine identifiers; timestamp; packet payload; protocol; source and destination ports; request type; and/or request response type; etc. The computer system can then compile groups of discrete packet fragments into complete data packets.

In one example, the computer system extracts a corpus of packet fragments with metadata from the PCAP files and identifies a set of unique IP addresses represented in this corpus of packet fragments. The computer system then: selects a first group of packet fragments in the PCAP file that designate a first IP address—in this set of unique IP addresses—as a source; and segments the first group of packet fragments into a first set of packet fragment subgroups, wherein each packet fragment subgroup designates one other IP address as a destination. The computer system then: selects a first packet fragment subgroup—in this first set of packet fragment subgroups—designating a first destination IP address; and segments the first packet fragment subgroup into a first set of contiguous packet fragment clusters, wherein each packet fragment cluster contains packet fragments designating the same protocol, the same source and destination ports, the same request type, and/or the same request response type. Then, for a first packet fragment cluster in this first set of contiguous packet fragment clusters, the computer system: retrieves packet fragments in this first packet fragment cluster; sorts these packet fragments by timestamp; extracts data from these packet fragments; reassembles these packet fragments into a first data packet according to their timestamps; and labels the first data packet with a first time of the earliest timestamp of packet fragments in this first packet fragment cluster, the first source IP address, and the first destination IP address.

In this example, the computer system then repeats this process for each other packet fragment cluster in this first set of contiguous packet fragment clusters to generate a first cluster of data packets, each labeled with: a time of the earliest timestamp of packet fragments in its corresponding packet fragment cluster; the first source IP address; and a destination IP address. The computer system further repeats this process for each other packet fragment subgroup in the first set of packet fragment subgroups to generate a subgroup of data packets, each labeled with: a time of the earliest timestamp of packet fragments in its corresponding packet fragment cluster; a source IP address of its corresponding packet fragment cluster; and a destination IP address of its corresponding packet fragment cluster. The computer system further repeats this process for each other group of packet fragments to generate a corpus of data packets, wherein each data packet is labeled with: a time of the earliest timestamp of packet fragments in its corresponding packet fragment cluster; a source IP address of its corresponding packet fragment cluster; and a destination IP address of its corresponding packet fragment cluster.

The computer system can therefore group packet fragments—in the population of packet fragments extracted from the PCAP file—into a set of packet fragment clusters based on congruent addresses of source machines, congruent addresses of destination machines, and continuity of timestamps associated with packet fragments in this population of packet fragments. For each cluster of packet fragments in the set, the computer system can then: define an order of packet fragments in the cluster of packet fragments based on timestamps of packet fragments in the cluster of packet fragments; and recombine the cluster of packet fragments into a singular packet fragment based on this order.

More specifically, the computer system can: cluster packet fragments by packet fragment metadata stored in the PCAP file; and then compile data—extracted from one contiguous cluster of packet fragments—into one data packet labeled with a (relative or absolute) time that the packet fragment was transmitted from a particular source machine to a particular destination machine on the second network, an identifier of the particular source machine, and an identifier of the particular destination machine. This corpus of data packets may therefore represent multiple concurrent and/or serial "conversations"—normalized for network traffic, bandwidth, and configuration—between machines within and external to any network during an analogous attack.

5.1 Human-Readable Playbook

Figure 4:
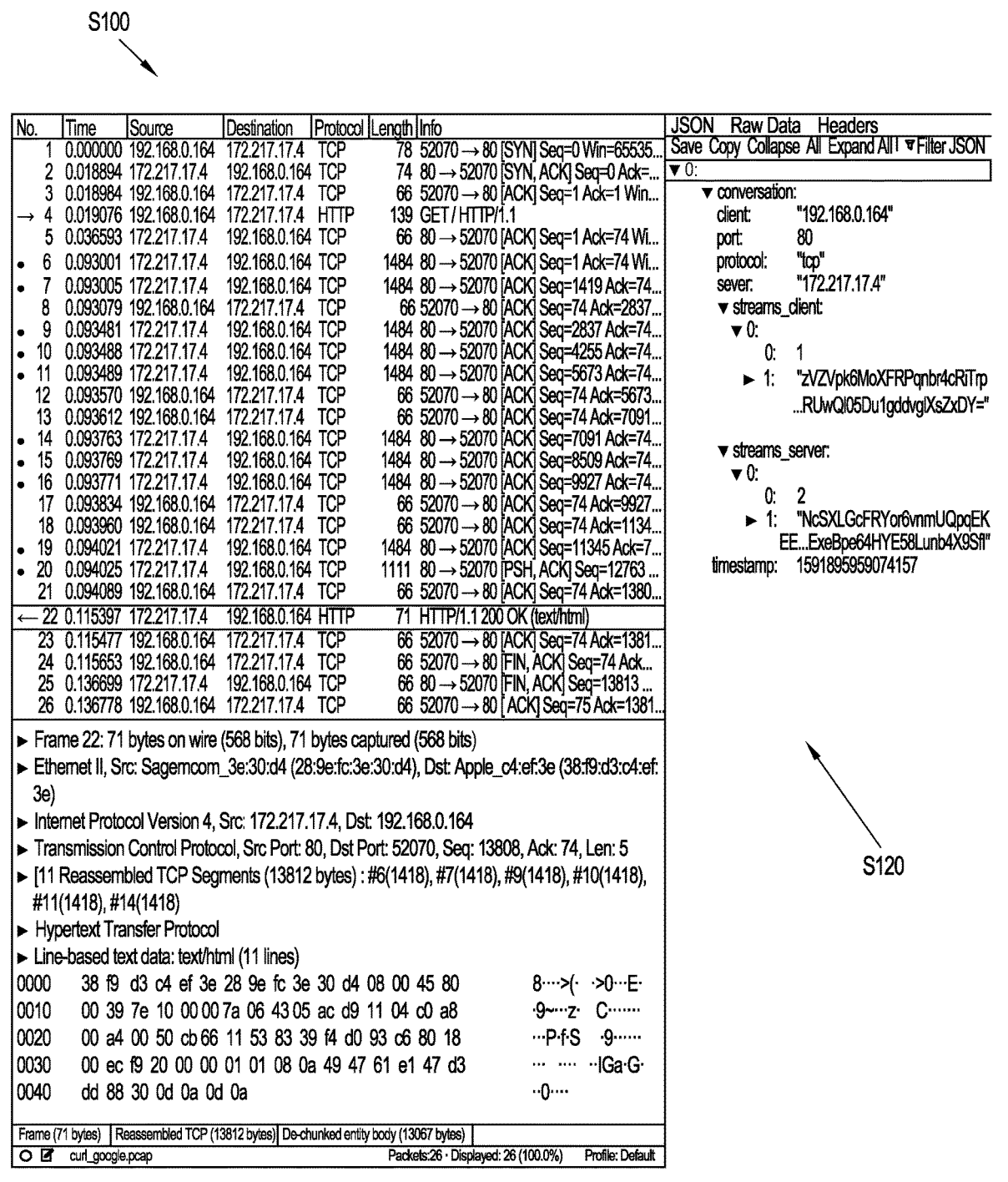

In one variation shown in FIG. 4, the computer system can derive a human-readable summary of "conversations" represented in and reconstructed from the PCAP file and then present this summary to security personnel. For example, the computer system can compress the set of data packets generated from the PCAP file—such as by removing an Open Systems Interconnection (or "OSI") data from these data packets and extracting remaining application, source and destination descriptors, and data packet sizes—to generate a short (or "minimum" set of high-level descriptions of the conversations between machines during the attack on the second network. The computer system can then present this human-readable summary to the security personnel and enable the security personnel to manually assign source and destination actors and to define triggers to each conversation represented in this human-readable summary. The computer system can then execute methods and techniques described below to distribute data packets and triggers to corresponding agents on the network and execute the attack simulation accordingly.

6. Agent Allocation

The computer system can then designate internal and external agents as actors to send and receive data packets during playback of the PCAP file on the target network in Blocks S130, S132, and S134.

In one implementation, the computer system scans the set of unique IP addresses represented in the PCAP file for: a first group of internal IP addresses of machines inside of the second network; and a second group of external IP addresses of machines external to the second network. Then, for a first internal IP address in the first group, the computer system: associates the first internal IP address with a first internal agent inside of the target network; and overwrites each source and destination IP address—in the corpus of data packets—specifying this first internal IP address with the IP address of the first internal agent. Similarly, for a second internal IP address in the first group, the computer system: associates the second internal IP address with a second internal agent inside of the target network; and overwrites each source and destination IP address—in the corpus of data packets—specifying this second internal IP address with the IP address of the second internal agent. The computer system repeats this process for each other internal IP address in the first group.

Similarly, for a first external IP address in the second group, the computer system: associates the external IP address with a first external agent outside of the target network; and overwrites each source and destination IP address—in the corpus of data packets—specifying this first external IP address with the IP address of the first external agent. The computer system repeats this process for each other external IP address in the second group.

Therefore, the computer system can replace IP addresses—representative of machines within and connected to the second network during the previous attack—contained in the corpus of data packets with IP addresses of agents—within and connected to the target network—available for attack simulation.

6.1 Manual Agent Allocation

In a similar implementation, the computer system can identify quantities of unique internal machines represented in the PCAP file and then prompt security personnel to manually assign this quantity of internal agents on the target network to attack simulation.

For example, the computer system can automatically designate a dedicated external agent—installed on an asset external to the target network—for the simulation. The computer system can then: identify a quantity of internal machines—within the second network—involved in the malicious attack on the second network based on addresses of source machines and addresses of destination machines associated with packet fragments represented in the PCAP file; allocate this quantity of internal agents—installed on assets within the target network—for the attack simulation; and prompt security personnel to manually select this quantity of internal agents for the attack simulation. In this example, the computer system can: present a list of IP addresses of internal assets loaded with the attack simulation software or a map of internal assets within the target network to security personnel, such as via a security portal described below; and prompt the security personnel to select a quantity of these internal agents equal to the quantity of internal machines represented in the PCAP file.

The computer system can then implement methods and techniques described above to assign these internal agents to send and receive data packets during the attack simulation.

Therefore, in this implementation, the computer system can enable the security personnel to reconfigure (or "customize") replay of the PCAP file on different combinations of agents within and external to the network over time and to thus validate configuration of different security technologies at different combinations of assets across the network to fulfill response expectations to the same security threat represented in the PCAP file occurring in different locations and between different assets within the network.

6.2 Agent Allocation by Machine/Agent Characteristics

In one variation, when selecting the first internal agent to associate with the first internal IP address as in the foregoing implementation, the computer system can predict a type of the first machine at the first internal IP address in the second network based on metadata of packet fragments—in the PCAP file—designating the first internal IP address as a source or destination, such as based on: ports designated in packet fragments inbound to the first machine; or file transfer commands confirmed by the first machine. The computer system can then: identify an internal agent installed on an asset of the same or similar type within the target network; associate this internal agent with the first internal IP address in the PCAP file; and update source and destination IP addresses in the corpus of data packets accordingly. The computer system can repeat for other internal and external IP addresses represented in the PCAP file.

In one implementation, the computer system can identify a set of internal machines—within the second network—involved in the malicious attack on the second network based on unique addresses (e.g., IP addresses) of source machines and destination machines associated with packet fragments represented in the PCAP file. The computer system can then derive a set of characteristics of a first internal machine in this set from packet fragments and metadata in the PCAP file, such as: a transmit port; a receive port; an operating system; a machine type; file types of data stored in local memory; or network access permissions. The computer system can then identify an internal asset—within the target network and loaded with an internal agent—that exhibits characteristics analogous (e.g., identical, similar, or nearest) to the set of characteristics of the first internal machine. For example, the computer system can weight characteristics of the first internal machine in order of: transmit and receive port; machine type; operating system; network access permissions; and finally local memory file types. The computer system can then score each internal asset in the target network according to similarity to characteristics of the first internal machine, adjusted by weight of these characteristics. The computer system can repeat this process for each other internal machine in the set to derive characteristics of these other internal machines and then score internal assets in the target network by similarity to characteristics of each of the internal machines. Finally, the computer system can select: a combination of internal assets on the target network—including one internal asset per internal machine represented in the PCAP file—that maximizes the aggregate score of this combination of internal assets; link each internal asset in this combination to a corresponding internal machine represented in the PCAP file; and designate each of these internal assets as actors to simulate its corresponding internal machine during the attack simulation on the target network.

Therefore, in this variation, the computer system can associate internal assets/agents in the target network with internal machines represented in the PCAP file based on similarity of certain characteristics such that simulation actions within the attack simulation on the target network are executed by internal assets that represent likely attack vectors for a similar, real attack on the target network.

Conversely, to minimize security risk that a data packet within the attack simulation may pose to an internal asset/agent designated as an actor in the attack simulation (e.g., by ensuring that a recipient agent is not configured to execute a command contained in a data packet received from another agent during the attack simulation on the target network), the computer system can associate internal machines represented in the PCAP file with dissimilar internal assets on the target network. For example, the computer system can select: a combination of internal assets on the target network—including one internal asset per internal machine represented in the PCAP file—that minimizes the aggregate score of this combination of internal assets; link each internal asset in this combination to a corresponding internal machine represented in the PCAP file; and designate each of these internal assets as actors to simulate its corresponding internal machine during the attack simulation on the target network.

7. Simulation Schedule

The computer system can then generate a schedule (or a set of time- or action-based triggers) for transmission of the corpus of data packets between these internal and external agents in Block S136.

7.1 Time-Based Triggers

In one implementation, the computer system: sorts the corpus of data packets by timestamp; calculates relative time offsets between consecutive data packets in the attack simulation based on these timestamps; and generates a schedule containing a sequence of relative timers based on these relative time offsets. For example, the computer system can generate a first relative timer for transmission of a second data packet, which defines a duration equal to a time offset between the first data packet and the second data packet and is configured for activation upon receipt of confirmation that a first source agent for the first data packet transmitted the first data packet to a first destination agent within or outside of the target network. Similarly, the computer system can generate a second relative timer for transmission of a third data packet, which defines a duration equal to a time offset between the second data packet and the third data packet and is configured for activation upon receipt of confirmation that a second source agent for the second data packet transmitted the second data packet to a second destination agent within or outside of the target network. Therefore, in this example, when the computer system initiates the attack simulation, the computer system can: initiate the second relative timer upon receipt of confirmation that the second source asset transmitted a second data packet to its second designated destination agent; and then transmit a command to the third source agent to transmit a third data packet to its third designated destination agent upon expiration of the second relative timer.

In another implementation, the computer system: sorts the corpus of data packets by timestamp; calculates absolute time offsets from the first data packet in the attack simulation to each other data packet in the attack simulation based on these timestamps; and generates a schedule containing a set of absolute timers based on these absolute time offsets. For example, the computer system can generate: a first absolute timer for transmission of a second data packet, which defines a duration equal to a time offset between the first data packet and the second data packet; a second absolute timer for transmission of a third data packet, which defines a duration equal to a time offset between the first data packet and the third data packet; and a third absolute timer for transmission of a fourth data packet, which defines a duration equal to a time offset between the first data packet and the fourth data packet. Therefore, in this example, when the computer system initiates the attack simulation, the computer system can initiate each of these timers remotely and then serve a prompt to each source agent to transmit its next data packet to its designated destination agent when the corresponding timers expire. Alternatively, when the computer system initiates the attack simulation, the computer system can transmit durations of these timers to source agents assigned to corresponding data packets and trigger these source agents to initiate local timers for these timer durations. These source agents can then selectively transmit their next data packets to designated destination agents responsive to expiration of corresponding timers.

The computer system can thus aggregate these time-based triggers into a schedule for internal and external agents—thus designated as source assets for data packets within the attack simulation—to send their assigned data packets to corresponding internal and external agents thus designated as destination assets for these data packets

7.2 Action-Based Triggers

Additionally or alternatively, the computer system can define action-based triggers for transmission of data packets between source and destination agents during the attack simulation.

In one implementation, the computer system: extracts a cascade of actions and responses between machines during the attack on the second network based on metadata contained in the PCAP file; defines action-based triggers for the corpus of data packets accordingly; and write these action-based triggers to corresponding data packets in the attack simulation. For example, the computer system can interpret a sequence of behaviors on the second network from the PCAP file, including: transmission of a command (a first data packet) by a first machine to a second machine at a first time; transmission of a command (a second data packet) by the second machine to a third machine at a second time; transmission of a file (a third data packet) by the third machine to the first machine at a third time; and transmission of a response (a fourth data packet) by the third machine to the second machine at a fourth time. In this example, the computer system can derive a set of action-based triggers from this sequence of behaviors, including: transmission of the first data packet by a first agent to a second agent at a start time triggered by the integration manager; transmission of the second data packet by the second agent to a third agent in response to receiving the first data packet; transmission of the third data packet by the third agent to the first agent in response to receiving the second data packet; and transmission of the fourth data packet by third agent to the second agent in response to transmitting the third data packet to the first agent. The computer system can this write these action-based triggers to their corresponding data packets.

However, the computer system can implement any other method or technique to define an order or schedule for transmission of data packets between the agents within and external to the target network during the attack simulation.

7.3. Digital Signature

In one variation, the computer system can digitally sign each data packet in the attack simulation, such as to prevent tampering and/or to key a data packet to an action-based trigger for executing a next simulation action.

In one implementation, the computer system can sign each data packet in the attack simulation with a digital private certificate, such as with Public Key Infrastructure, prior to deploying the attack simulation to the target network. In this example and as described below, upon receiving a signed data packet during the attack simulation, an agent can: read the signature on the data packet; identify the data packet as an action within the attack simulation; initiate a next simulation action (e.g., transmit a net data packet to another agent) succeeding receipt of the data packet according to the simulation schedule; and then discard the data packet without reading or executing commands with the data packet.

8. Target Response Type

Furthermore, the computer system can designate a target response type for the attack simulation by one or a population of security technologies deployed on the target network, such as: detection (or "logging"); prevention; or alerting.

In one implementation, the computer system (or the integration manager, a human operator) can: retrieve a service level agreement of a security technology deployed on the target network; extract a response type (e.g., detect, prevent, or alert) for a type of the attack—represented in the PCAP file—from the service level agreement; and set this response type as a target response type to the attack simulation by the security technology. In a similar implementation, the computer system (or the integration manager, a human operator) can: retrieve a current configuration of the security technology; read a response type that the security technology is currently configured to execute for the type of the attack—represented in the PCAP file—from this current configuration; and set this response type as a target response type of the security technology for the attack simulation. The computer system can repeat this process for other security technologies deployed on the target network to define a set (e.g., a matrix) of target response types by these security technologies to the attack simulation.

The computer system can additionally or alternatively assign particular response types for transmission of individual data packets between source and destination agents during the attack simulation, such as based on: severity or risk to the target network posed by behaviors represented by transmission of an individual data packets between designated source and destination agents; and a current configuration or service level agreement of the security technology. The computer system can repeat this process for other data packets in the attack simulation and for other security technologies deployed on the target network in order to generate a set (e.g., a "matrix") of target response types—by these security technologies—to transmission of data packets into, within, and/or out of the target network during the attack simulation.

9. Simulation Action

The computer system can then combine a data packet with a source agent, a destination agent, and a time—or action-based trigger to define a "simulation action" within the attack simulation. The computer system can also associate this simulation action with a protocol, a packet payload, source and destination ports, a request type, and/or request response type, etc. derived from the cluster of packet fragments—characteristic of this data packet—contained in the PCAP file. The computer system can further associate this simulation action with a target response type by one or more security technologies deployed on the target network.

The computer system can therefore: generate a set of simulation actions that, when executed by source agents—within and external to the target network—simulate behaviors representative of the previous attack on the second network; and define characteristics for verifying responses to these behaviors by security technologies deployed on the target network.

10. Attack Simulation Configuration

Block S140 of the method S100 recites uploading each data packet to its corresponding source agent for storage in local memory during a second time period succeeding the first time period. Generally, in Block S140, the computer system can configure the set of assets to execute the attack simulation.

In one implementation, the computer system schedules a start time for the attack simulation. Then, prior to the start time of the attack simulation, the computer system distributes each data packet in the attack simulation to its corresponding source agent within or outside of the target network. In the implementation described above in which the computer system defines relative or absolute time-based triggers for transmission of these data packets to their designated destination agents and in which source agents manage these time-based triggers internally, the computer system also transmits definitions for these time-based triggers to their corresponding source agents when configuring the target network for the attack simulation. Additionally or alternatively, in the implementation described above in which the computer system defines action-based triggers for transmission of these data packets to their designated destination agents, the computer system transmits definitions for these action-based triggers to their corresponding source agents when configuring the target network for the attack simulation.

11. Attack Simulation

Block S150 of the method S100 recites initiating transmission of the set of discrete data packets from designated source agents to designated destination agents according to transmission correspond triggers to simulate the attack on the target network. Generally, at the scheduled simulation start time, the computer system (or the integration manager) initiates the attack simulation on the target network in Block S150. During this simulation attack, source agents can transmit their assign data packets to designated destination agents within and external to the target network automatically according to time- and/or action-based triggers associated with these data packets or responsive to triggers distributed to these agents by the computer system (or by the integration manager), as shown in FIGS. 1 and 3.

11.1 Action-Based Trigger

In one implementation, upon receipt of a "start" command from the integration manager, a first agent transmits a first data packet—stored locally at the first agent—to a second agent. Upon receipt of the first data packet from the first agent, the second agent transmits a second data packet—stored locally at the second agent—to a third agent according to a first action-based trigger associated within the second data packet. Upon receipt of the second data packet from the second agent, the third agent transmits a third data packet—stored locally at the second agent—to the first agent according to a second action-based trigger associated within the third data packet. Upon transmission of the third data packet to the first agent, the third agent transmits a fourth data packet—stored locally at the second agent—to the second agent according to a third action-based trigger associated within the fourth data packet.

For example, the computer system can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. In Block S132, the computer system can then: assign a first transmit time, at a (absolute) scheduled start time of the simulation, to the first data packet; and assign a second transmit trigger, responsive to receipt of the first data packet, to the second data packet based on the PCAP file representing transmission of the second data packet succeeding transmission of the first data packet during the malicious attack on the second network. Later, during the attack simulation, a first agent—designated to a source agent for the first data packet—can transmit the first data packet to a second agent—designated as a recipient agent for the first data packet—at the first transmit time. In response to receipt of the first data packet, the second agent—designated as a source agent for the second data packet—can transmit the second data packet to the first agent (or to another recipient agent) according to the second transmit trigger.

11.2 Relative Time-based Action

In another implementation, upon receipt of a "start" command from the integration manager, a first agent transmits a first data packet—stored locally at the first agent—to a second agent. Upon receipt of the first data packet from the first agent, the second agent: initiates a first timer for a first duration associated with a second data packet according to a second simulation action; and transmits the second data packet—stored locally at the second agent—to a third agent when the first timer expires. Upon receipt of the second data packet from the second agent, the third agent: initiates a second timer for a second duration associated with a third data packet according to a third simulation action; initiates a third timer for a third duration associated with a fourth data packet according to a third simulation action; transmits the third data packet—stored locally at the third agent—to the first agent when the second timer expires; and transmits the fourth data packet—stored locally at the third agent—to the second agent when the third timer expires.

For example, the computer system can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. The computer system can then: define a scheduled or manually-initiated start of the simulation as a first trigger for transmission of the first data packet during the attack simulation; extract a time offset between the first cluster of packet fragments and the second cluster of packet fragments based on timestamps of packet fragments represented in the PCAP file (e.g., based on a time difference between a timestamp of the first packet fragment in the first cluster of packet fragments and a timestamp of the first packet fragment in the second cluster of packet fragments); and then assign a second time-based transmit trigger for the second data packet succeeding transmission of the first data packet by the time offset.

Thus, in this example, a first source agent—assigned to the first data packet—can transmit the first data packet to a first recipient agent in response to initiation of the attack simulation; and the computer system can scan (e.g., in real-time or following conclusion of the attack simulation) a log of a security technology deployed on the network for a first security event representing transmission of data from the first source agent to the first recipient proximal this start time (e.g., up to one second before and five seconds after initiation of the attack simulation). The first recipient agent—also designated as the second source agent for the second data packet—can then transmit the second data packet to a second recipient agent at the second transmit time; and the computer system can scan the log of the security technology for a second security event representing transmission of data from the second source agent to the second recipient agent proximal the second transmit time (e.g., up to one second before and five seconds after transmission of the first data packet from the first agent to the second agent).

11.3 Absolute Time-Based Action

In yet another implementation, upon transmitting a "start" command to a first agent designated as a machine for a first data packet, the integration manager activates a set of timers according to absolute time offsets between the first data packet and subsequent data packets in the attack simulation. Upon receipt of the "start" command from the integration manager, the first agent transmits the first data packet—stored locally at the first agent—to a second agent. Upon expiration of each subsequent timer in the set of timers, the integration manager transmits a "transmit" command to a corresponding agent, which then transmits the corresponding data packet—stored locally at the agent—to a designated destination agent.

For example, the computer system can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet in Block S120. The computer system can then: assign a first transmit time—at a scheduled start time of the simulation—to the first data packet; extract a time offset between the first cluster of packet fragments and the second cluster of packet fragments based on timestamps of packet fragments represented in the PCAP file; and then assign a second transmit time—succeeding the first transmit time by the time offset—to the second data packet.

However, the integration manager can coordinate transmission of data packets between source and destination agents within and external to the target network according to any other schema during the attack simulation.

12. Security Technology Event Data Access and Association

Block S160 of the method S100 recites monitoring a set of security technologies, deployed on the target network, for security events related to the simulation. Generally, in Block S160, the computer system can monitor security event logs of security technologies deployed to the target network for security events responsive to the attack simulation.

In particular, once the attack simulation is deployed and initiated on the target network at the start time, the computer system (or the integration manager more specifically) can monitor security event data written to logs published by security technologies deployed on the target network for responses to the attack simulation. The computer system can continue to monitor these security logs for responses to the attack simulation (or to transmission of particular data packets between source and destination agents during the attack simulation) until conclusion of the attack simulation, such as: upon receipt of confirmation that a source agent sent a last data packet to its designated destination agent; or upon expiration of a last absolute or relative timer for these data packets in the attack simulation.

In one implementation, while this attack simulation is in process on the target network, the computer system can scan security event logs published by these security technologies for detection, prevention, or alert events designating metadata of known simulation actions within the attack simulation, such as: IP addresses of source and/or destination agents; a protocol; a packet payload; source and destination ports; request types; and request response types characteristic of known simulation actions within the attack simulation. For example, the computer system can associate detection, prevention, and alert events in these security event logs with particular simulation actions within the attack simulation based on: correspondence between known transmission types of data packets by source agents and detection, prevention, and alert event times; and correspondence between source IP addresses, destination IP addresses, protocols, packet payloads, source and destination ports, request types, and request response types, etc. characteristic of known simulation actions and corresponding metadata captured in detection, prevention, and alert event published in these security event logs.

13. Security Technology Validation

Block S110 of the method S100 recites, in response to absence of security events related to the simulation, generating a prompt to reconfigure the set of security technologies to respond to the attack. Generally, in Block S110, the computer system can: compare detection, prevention, and alert events thus associated with the simulation action to target response types assigned to these simulation actions or to the attack simulation more generally in order to validate a current configuration of security technologies deployed to the target network; and then selectively prompt investigation and reconfiguration of these security technologies responsive to failure of these security technologies to respond to the attack as planned.

In one implementation shown in FIGS. 2 and 3, for each simulation action in the attack simulation, the computer system verifies that at least one security technology (or a particular security technology) detected, prevented, or alerted on the simulation action according to a response type assigned to this simulation action; if not, the computer system flags these security technologies (or the particular security technology) for investigation and reconfiguration. Additionally or alternatively, the computer system can verify that at least one security technology (or an particular security technology) detected, prevented, or alerted on the attack simulation as a whole according to a response type assigned to this attack simulation; if not, the computer system can flag these security technologies as not properly configured to respond to an analogous attack on the target network and prompt further investigation and reconfiguration of these security technologies accordingly.

For example, the computer system can return these validation results to a security portal—accessible by security personnel—within a native application or web browser executing on a personal computing device. The security portal can then: render a list of simulation actions within the attack simulation; label each of these simulation actions with identifiers of assigned source and destination agents; indicate responses by deployed security technologies on the target network to these simulation actions; and label each simulation attack with its corresponding validation result. The security portal can also highlight or flag each individual simulation action that failed to yield a target response by at least one security technology and/or indicate whether these security technologies failed to produce a target global response to the attack simulation. However, the integration manager and the security portal can present validation results for the attack simulation to security personnel in any other format in order to alert security personnel to a need to reconfigure or redeploy security technologies to the target network in order to detect and respond to future attacks analogous to the previous attack on the second network.

13.1 Multiple Target Responses Per Security Technology

One variation of the method S100 includes: scanning a log of a security technology, deployed on the target network, for a security event related to a first data packet in the set of data packets and for a second security event related to a second data packet in the set of data packets in Block S160; in response to presence of the security event in the log, confirming configuration of the security technology to respond to a first stage of the malicious attack corresponding to the first data packet in Block S172; and, in response to absence of the second security event in the log, generating a prompt to reconfigure the security technology to respond to a second stage of the malicious attack corresponding to the second data packet in Block S110. Generally, in this variation, the computer system (or security personnel, a service level agreement, etc.) can designate a particular security technology deployed on the network to detect, prevent, or alert on multiple stages of the attack simulation (e.g., transmission of multiple data packets between internal and external actors within the target network). Accordingly, in this variation, the computer system can: scan a log of this security technology for detection (or "logging") and prevention events related to transmission of these data packets during the attack simulation; and similarly scan an alert feed published by the security technology for alerts related to transmission of these data packets during the attack simulation.

In one example, the computer system recombines a first cluster of packet fragments—designating a first source address and a first destination address within the PCAP file—to generate a first data packet in Block S120. The computer system then assigns a first target "prevention" response—by a security technology deployed on the network—to the first data packet during the attack simulation.

Similarly, in this example, the computer system recombines a second cluster of packet fragments—designating a second source address and a second destination address within the PCAP file—to generate a second data packet in Block S120. The computer system also assigns a second target "alert" response—by the security technology—to the second data packet during the attack simulation.

During subsequent execution of the attack simulation, a first agent initiates transmission of the first data packet to a second agent according to a first transmission trigger; and the second agent similarly initiates transmission of the second data packet to a third agent (or back to the first agent) according to a second transmission trigger.

During or upon completion of the attack simulation, the computer system scans the log of the security technology for a security event indicating prevention of a transmission from the first agent to the second agent during a period of the attack simulation in Block S160. (Upon detecting this security event in the log, the computer system can also verify that the security event corresponds to the first data packet based on a digital signature, indicators of compromise, or other data representative of the first data packet in the security event.) Upon detecting or confirming the security event in the log, the computer system can confirm that the security technology is functioning as planned during the attack simulation and is therefore properly configured. Conversely, in response to absence of a security event indicating prevention of transmission of the first data packet during the attack simulation, the computer system can: determine that the security technology did not function as planned during the attack simulation; and thus generate a first prompt to reconfigure the security technology to prevent network traffic—analogous to the first data packet—on the target network, as shown in FIG. 2.

(Additionally or alternatively, the computer system can verify that a security technology—such as the target security technology or another security technology deployed on the network—prevented transmission of the first data packet from the first agent to the second agent during the first stage of the attack simulation if a first actor log at the first agent indicates failure to transmit the first data packet to the second agent and/or if a second actor log at the second agent indicates failure to receive the first data packet from the second agent, as shown in FIG. 2.)

The computer system similarly scans the log of the security technology (or a separate alert feed published by the security technology) for a security alert prompting investigation of a second transmission from the second agent to the third agent during the period of the attack simulation in Block S160. (Upon detecting this security alert in the log or separate alert feed, the computer system can also verify that the security alert corresponds to the second data packet based on a digital signature, indicators of compromise, or other data representative of the second data packet in the security alert.) Upon detecting or confirming the security alert in the log or separate alert feed, the computer system can confirm that the security technology is functioning as planned during the attack simulation and is therefore properly configured. Conversely, in response to absence of a security alert related to the second data packet, the computer system can: determine that the security technology did not function as planned during the attack simulation; and thus generate a second prompt to reconfigure the security technology to generate alerts responsive to network traffic—analogous to the second data packet—on the target network.

13.2 Target Responses Across Multiple Security Technologies

A similar variation of the method S100 shown in FIG. 3 includes: scanning a first log of a first security technology, deployed on the target network, for a first security event related to a first data packet in the set of data packets in Block S160; in response to presence of the first security event in the first log, confirming configuration of the first security technology to respond to a first stage of the malicious attack corresponding to the first data packet in Block S172; scanning a second log of a second security technology, deployed on the target network, for a second security event related to a second data packet in the set of data packets in Block S160; and, in response to absence of the second security event in the second log, generating a prompt to reconfigure the second security technology to respond to a second stage of the malicious attack corresponding to the second data packet in Block S170.

Generally, in this variation, the computer system can implement similar methods and techniques to designate multiple security technologies deployed on the network to detect, prevent, or alert on multiple stages of the attack simulation. Accordingly, in this variation, the computer system can: scan logs of these security technologies for detection (or "logging") and prevention events related to transmission of these data packets during the attack simulation; and scan one or more alert feeds published by these security technology for alerts related to transmission of these data packets during the attack simulation.

In this foregoing example, the computer system recombines a third cluster of packet fragments—designating a third source address and a third destination address within the PCAP file—to generate a third data packet in Block S120. The computer system also assigns a third target "detect" response—by a second security technology—to the third data packet during the attack simulation.

During subsequent execution of the attack simulation, the third agent initiates transmission of the third data packet to the second agent (or the first agent, etc.) according to a third transmission trigger (e.g., receipt of the second data packet from the second agent).

During or upon completion of the attack simulation, the computer system scans a second log of the second security technology for a third security event indicating detection of a transmission from the third agent to the second agent during the period of the attack simulation in Block S160. (Upon detecting this third security event in the log, the computer system can also verify that the third security event corresponds to the third data packet based on a digital signature, indicators of compromise, or other data representative of the third data packet in the third security event.) Upon detecting or confirming the third security event in the log, the computer system can confirm that the second security technology is functioning as planned during the attack simulation and is therefore properly configured. Conversely, in response to absence of a security event indicating detection of transmission of the third data packet during the attack simulation, the computer system can: determine that the second security technology did not function as planned during the attack simulation; and thus generate a third prompt to reconfigure the second security technology to detect network traffic—analogous to the third data packet—on the target network.

13.2 Simulation Failure

In one variation, the computer system accesses and/or monitors: a first actor log of a first agent assigned to transmit a first data packet to a second agent; and a second actor log of the agent assigned to receive the data packet from the first agent. If the first actor log indicates failure to transmit the first data packet to the second agent and/or if the computer system second actor log of the second agent indicates failure to receive the first data packet from the second agent, the computer system can flag this first data packet. The computer system computer network then query a log of the security technology and/or logs of other security technologies deployed on the security technology for prevention events correlated with transmission of the first data packet from the first agent to the second agent. In response to verifying that at least one of the security technologies logged a prevention event for transmission of the first data packet from the first agent to the second agent, the computer system can confirm that the transmission failure represented in the first actor log or receive failure represented in the second actor log was caused by an action executed by a security technology deployed on the network.

Conversely, in response to determining that no security technology deployed on the network logged a prevention event for transmission of the first data packet from the first agent to the second agent, the computer system can predict that a system failure prevented transmission of the first data packet from the first agent to the second agent, such as an endpoint firewall or another device located between the first and second agents on the network. In response to detecting a system failure, the computer system can then: serve a prompt to security personnel to reconfigure an endpoint firewall or other device between the first and second actors before redeploying the attack simulation to the same combination of actors within and external to the network; and/or implement methods and techniques described herein to select an alternate combination of actors to execute the attack simulation and redeploy the attack simulation on the network accordingly.

14. Re-Simulation

Over time, the computer system can repeat the foregoing methods and techniques to: assign a different combination of internal and external agents as sources and destinations for the corpus of data packets in the attack simulation; modify time- and/or action-based triggers for transmission of these data packets between the source and destination agents; compile these configurations into additional, unique variations of the attack simulation; deploy and execute these additional variations of the attack simulation on the target network; (re)validate the security technologies deployed on the target network detect, prevent, and/or alert on individual simulation actions or entire attack simulations more generally across these attack simulation variations; and selectively prompt investigation and reconfiguration of these security technologies accordingly.

In one implementation, the computer system can automatically: generate a set of (e.g., ten, dozens) variations of the attack simulation; sequentially deploy these attack simulation variations to the target network over minutes, hours, or days; and validate responses by security technologies on the target network to these attack simulation variations. For example, a seemingly-trivial change to the target network or addition or removal of assets to or from the target network may enable two assets within the network to communicate. The computer system can therefore execute regular reassessments of security technologies deployed on the target network to respond to attacks analogous to the malicious attack on the second network. Thus, in this example, the computer system can automatically initiate an instance of the attack simulation: every five seconds, every minute, every hour, once per day, once per week, or once per month, etc.; on the same constellation of actors within and external to the target network; and/or on a prescribed, rotating, or pseudorandomly-assigned constellation of actors within and external to the target network.

Additionally or alternatively, the computer system can initiate an instance of the attack simulation on-demand in response to a manual input by security personnel.

In another implementation, the computer system can automatically deploy identical instances and/or variations of the attack simulation to the target network over time in response to reconfiguration of a security technology on the target network in order to verify whether this reconfiguration effected detection, prevention, or alerting on the attack simulation by the security technology. For example, the computer system flags a security technology for failing to respond as planned or expected to a stage of a first instance of the attack simulation executed on the target network. Later, and following (or in response to) confirmation of reconfiguration of the security technology according to result of the first instance of the attack simulation, the computer system initiates transmission of the same set of data packets between the same set of source and recipient agents according to the same transmission triggers in order to re-simulate the malicious attack on the target network with minimum changes from the previous instance of the attack simulation. The computer system then implements methods and techniques described above: to rescan the log of the security technology for a security event related to re-simulation of the malicious attack on the target network; to confirm configuration of the security technology to respond to the malicious attack in response to presence of the second security event in the log; and/or to flag the security technology for further reconfiguration in response to absence of the second security event in the log.

14.1 Multiple Concurrent Simulations

In one variation, the computer system executes multiple attack simulations—analogous to multiple different malicious attacks that previously occurred on multiple other networks—concurrently across multiple combinations of internal agents within the target network.

In this variation, the computer system can also allocate the same external agent (e.g., the same server or remote computer system) for these concurrent attack simulations. For example, the computer system can allocate a single external agent executing on a single server or remote computer system to function as analogous external attack vectors across multiple different attack simulations occurring within a single target network or across multiple target networks simultaneously.

15. Intra-Network PCAP File

As described above, the computer system can access a PCAP file that represents packet fragments transmitted between machines within and external to a second network during a prior malicious attack on the second network, wherein the second network defines a second configuration different from a first configuration of the target network and includes a second constellation of machines different from a first constellation of assets on the target network. The computer system can then recombine packet fragments in this PCAP file into discrete data packets, assign these data packets to agents internal and external to the target network, and manage transmission of these data packets between these agents in order to simulate the malicious attack—previously extant on the second network—on the target network and thus verify configuration of security technologies deployed on the target network to detect, prevent, or alert on an analogous attack.

Additionally or alternatively, the computer system can access a PCAP file that represents packet fragments transmitted between assets within and external to the target network during a prior malicious attack on the target network, such as prior to reconfiguration of security technologies deployed on the network and/or when a different constellation of assets were connected to the target network. The computer system can then recombine packet fragments in this PCAP file into discrete data packets, assign these data packets to agents internal and external to the target network (e.g., the same or similar assets involved in the prior attack), and manage transmission of these data packets between these agents in order to simulate the malicious attack—previously extant on the target network—on the target network and thus verify reconfiguration of security technologies deployed on the target network and/or verify configuration of these security technologies for the current constellation of assets connected to the target network.

16. Data Leak Prevention

As described above, the computer system can access a PCAP file that represents packet fragments transmitted between machines within and external to a second network during a prior command-and-control attack on the second network in order to simulate this command-and-control attack on the target network and thus verify configuration of security technologies deployed on the target network to detect, prevent, or alert analogous command-and-control attacks.

Additionally or alternatively, the computer system can access a PCAP file that represents packet fragments transmitted between machines within and external to the second network during a prior data breach on the second network. The computer system can then recombine packet fragments in this PCAP file into discrete data packets, assign these data packets to agents internal and external to the target network (e.g., the same or similar assets involved in the prior attack), and manage transmission of these data packets between these agents in order to simulate the data breach—previously extant on the second network—on the target network in order to verify configuration of security technologies deployed on the target network to detect, prevent, and/or alert on analogous data breaches.

As described above, the PCAP file contains packet fragments that, when recombined into data packets by the computer system in Block S120, contain complete authentic data transferred between machines internal and external to the second network during the prior malicious attack. Therefore, for a data breach attack on the second network, data packets reconstructed from the PCAP file by the computer system in Block S120 may contain sensitive data.

Thus, in this variation, the computer system can: detect these sensitive data in these data packets; modify or encrypt these sensitive data; and manage simulation of the data breach on the target network with data packets containing these modified or encrypted data. For example, the computer system can implement natural language processing, artificial intelligence, or other data type detection techniques to identify sensitive information in these reconstructed data packets, such as: names; phone numbers; email addresses; social security numbers; addresses; credit card and bank account numbers; and/or medical records; etc. The computer system can then replace (or "scrub") these sensitive values with non-sensitive or incoherent values of the same data types. Additionally or alternatively, the computer system can: scramble numerical values (e.g., replace credit card 1234-5678 . . . with 2315-4768); replace detected last name with pseudorandomly-selected names from a last-name database; replace detected city names with pseudorandomly-selected names from a city-name database; etc. in these data packets, thereby preserving types of these sensitive data from removing sensitivity of data contained in these data packets.

The computer system can then manage transmission of these data packets between agents within and external to the target network in order to simulate a data breach on the target network and to verify that security technologies deployed on target network are properly configured to detect (or "log"), prevent, or alert on analogous data breaches.

As a person skilled in the art will recognize from the previous detailed description and from the figures and claims, modifications and changes can be made to the embodiments of the invention without departing from the scope of this invention as defined in the following claims.

We claim:

1. A method for emulating a known attack on a computer network comprising:
   accessing a set of data packets representing data transmitted between machines in communication with a second computer network during a malicious attack on the second computer network during a first time period
   accessing a set of agents, installed on assets in communication with a target computer network, assigned as actors in a simulation of the malicious attack on the target computer network;
   for each data packet in the set of data packets:
      defining a transmission trigger, in a set of transmission triggers, for the data packet based on transmission of corresponding data during the malicious attack on the second computer network;
      designating a recipient agent, in the set of agents, to receive the data packet;
      designating a source agent, in the set of agents, to transmit the data packet to the recipient agent according to the transmission trigger; and
      triggering storage of the data packet in local memory at the source agent;
   during a second time period succeeding the first time period, initiating transmission of the set of data packets from source agents to recipient agents, in the set of agents, according to the set of transmission triggers to simulate the malicious attack on the target computer network;
   accessing a set of network event records generated by a security technology, deployed on the target computer network, during the second time period; and
   in response to absence of a network event record, in the set of network event records, indicating the malicious attack:
      generating a prompt to reconfigure the security technology to detect the malicious attack at the target computer network.

2. The method of claim 1, wherein accessing the set of data packets comprises:
   accessing a packet capture file representing packet fragments transmitted between machines in communication with the second computer network during the malicious attack on the second computer network during the first time period; and
   recombining packet fragments within the packet capture file based on packet fragment metadata to generate the set of data packets.

3. The method of claim 2, wherein recombining packet fragments within the packet capture file to generate the set of data packets comprises:
   recombining a first cluster of packet fragments to generate a first data packet in the set of data packets, each packet fragment in the first cluster of packet fragments designating a first source address and a first destination address within the packet capture file; and
   recombining a second cluster of packet fragments to generate a second data packet in the set of data packets, each packet fragment in the second cluster of packet fragments designating a second source address and a second destination address within the packet capture file.

4. The method of claim 1:
   wherein accessing the set of data packets comprises accessing the set of data packets comprising a first data packet; and
   further comprising:
      writing a digital signature to the first data packet; and
      during the second time period:
         at a first agent, initiating transmission of the first data packet to a second agent according to a first transmission trigger, the first agent and the second agent assigned to the first data packet, and the set of transmission triggers comprising the first transmission trigger; and
         at the second agent:
            receiving the first data packet from the first agent; and
            in response to detecting the digital signature in the first data packet, discarding the first data packet.

5. The method of claim 4:
   wherein accessing the set of data packets comprises accessing the set of data packets comprising a second data packet; and
   further comprising, at the second agent, initiating transmission of the second data packet to a third agent during the second time period in response to receiving the first data packet, the set of agents comprising the second agent and the third agent assigned to the second data packet, and the set of transmission triggers comprising the second transmission trigger.

6. The method of claim 1:
   wherein accessing the set of data packets comprises accessing the set of data packets comprising first data packet assembled from a first cluster of consecutive packet fragments designating a common source address and a common destination address within a packet capture file, the packet capture file representing packet fragments transmitted between machines in communication with the second computer network during the malicious attack on the second computer network during the first time period wherein defining a transmission trigger, designating a recipient agent, and designating a source agent for each data packet in the set of data packets comprises:
- defining a first transmission trigger for the first data packet based on timestamps of the first cluster of consecutive packet fragments;
- designating a first recipient agent, in the set of agents and within the target computer network, to receive the first data packet; and
- designating a first source agent, in the set of agents and external to the target computer network, to transmit the first data packet to the first recipient agent according to the first transmission trigger; and wherein generating the prompt to reconfigure the security technology to detect the malicious attack comprises generating the prompt in response to absence of the network event record, in the set of network event records, comprising characteristics correlated with the first data packet.

7. The method of claim 1, further comprising:
- accessing a second set of data packets representing data transmitted between machines in communication with a third computer network during a second malicious attack on the third computer network during a third time period;
- accessing a second set of agents, installed on assets in communication with the target computer network, as actors in a second simulation of the second malicious attack on the target computer network;
- for each data packet in the second set of data packets:
  - defining a transmission trigger, in a second set of transmission triggers, for the data packet based on transmission of corresponding data during the second malicious attack on the third computer network;
  - designating a recipient agent, in the second set of agents, to receive the data packet;
  - designating a second source agent, in the second set of agents, to transmit the data packet to the recipient agent according to the transmission trigger; and
  - triggering storage of the data packet in local memory at the source agent;
- during a fourth time period succeeding the third time period, initiating transmission of the second set of data packets from source agents to recipient agents, in the second set of agents, according to the second set of transmission triggers to simulate the second malicious attack on the target computer network;
- accessing a second set of network event records generated by a second security technology, deployed on the target computer network, during the fourth time period; and
- in response to presence of a second network event record, in the second set of network event records, indicating the second malicious attack, confirming configuration of the second security technology to respond to computer network attacks analogous to the second malicious attack at the target computer network.

8. The method of claim 1, wherein accessing the packet capture file comprises:
- accessing a packet capture file comprising a population of packet fragments that represent packet interchanges between hosts in communication with the second computer network during the malicious attack on the second computer network during the first time period;
- grouping packet fragments, in the population of packet fragments, into a set of clusters of packet fragments based on congruent addresses of source machines, congruent addresses of destination machines, and continuity of timestamps associated with packet fragments in the population of packet fragments; and
- for each cluster of packet fragments, in the set of clusters of packet fragments:
  - defining an order of packet fragments in the cluster of packet fragments based on timestamps of packet fragments in the cluster of packet fragments; and
  - recombining the cluster of packet fragments into a singular data packet, in the set of data packets, based on the order.

9. The method of claim 1:
- wherein accessing the set of data packets comprises accessing the set of data packets that represent data interchanges between machines in communication with the second computer network during the malicious attack on the second computer network during the first time period; and
- wherein designating the set of agents as actors in the simulation of the malicious attack on the target computer network comprises:
  - designating an external agent, installed on an asset external to the target computer network, for the simulation;
  - identifying a quantity of internal machines, within the second computer network, involved in the malicious attack on the second computer network based on addresses of source machines and addresses of destination machines associated with data interchanges represented by the set of data packets; and
  - designating the quantity of internal agents, installed on assets within the target computer network, for the simulation.

10. The method of claim 1, wherein accessing a set of agents assigned as actors in the simulation of the malicious attack on the target computer network comprises:
- identifying a set of internal machines, within the second computer network, involved in the malicious attack on the second computer network based on addresses of source machines and addresses of destination machines associated with data interchanges represented by the set of data packets; and
- for each internal machine in the set of internal machines:
  - accessing a set of characteristics of the internal machine;
  - identifying an internal asset, within the target computer network, exhibiting characteristics analogous to the set of characteristics of the internal machine; and
  - designating an agent, installed on the internal asset, as an actor to simulate the internal machine during the simulation of the malicious attack on the target network.

11. The method of claim 1:
- wherein accessing the set of data packets comprises accessing the set of data packets comprising:
  - a first data packet representing data transmitting from a first source address to a first destination address within the second computer network during the first time period; and
  - a second data packet representing data transmitting from a second source address to a second destination address within the second computer network during the first time period; and wherein defining a transmission trigger for each data packet in the set of data packets comprises:
assigning a first transmit time, at a scheduled start time of the simulation, to the first data packet;
accessing a time offset between the first data packet and the second data packet; and
assigning a second transmit time, succeeding the first transmit time by the time offset, to the second data packet.

12. The method of claim 1:
further comprising:
at a first source agent, in the set of agents and assigned to the first data packet, transmitting the first data packet to a first recipient agent, in the set of agents and assigned to the first data packet, at the first transmit time; and
at a second source agent, in the set of agents and assigned to the second data packet, transmitting the second data packet to a second recipient agent, in the set of agents and assigned to the second data packet, at the second transmit time; and
further comprising scanning the set of network event records for the security event representing detection of data transmission from the second source agent to the second recipient agent proximal the second transmit time.

13. The method of claim 1:
wherein accessing the set of data packets comprises:
accessing the set of data packets representing data transmitted between machines in communication with the second computer network during a command-and-control attack on the second computer network during the first time period, the second computer network:
defining a second configuration during the first time period different from a first configuration of the target computer network during the second time period; and
comprising a second constellation of machines during the first time period different from a first constellation of assets on the target computer network during the second time period; and
wherein initiating transmission of the set of data packets from source agents to recipient agents to simulate the malicious attack on the target computer network during the second time period comprises initiating transmission of the set of data packets from source agents to recipient agents, in the set of agents, to simulate the command-and-control attack on the target computer network.

14. The method of claim 1, further comprising:
during a third time period succeeding the second time period and in response to confirmation of reconfiguration of the security technology according to the prompt, initiating transmission of the set of data packets from source agents to recipient agents, in the set of agents, according to the set of transmission triggers to re-simulate the malicious attack on the target computer network;
accessing a second set of network event records generated by the security technology during the third time period; and
in response to presence of a second network event record, in the set of network event records, indicating the malicious attack:
confirming configuration of the security technology to respond to the malicious attack.

15. The method of claim 1:
wherein accessing the set of data packets comprises accessing the set of data packets comprising a first data packet designating a first source address and a first destination address within the second computer network;
further comprising, at a first agent, initiating transmission of the first data packet to a second agent according to a first transmission trigger during the second time period, the set of agents comprising the first agent and the second agent assigned to the first data packet, the set of transmission triggers comprising the first transmission trigger;
further comprising scanning the set of network event records for the security event indicating prevention of a transmission from the first agent to the second agent during the second time period; and
wherein generating the prompt to reconfigure the security technology comprises, in response to absence of the security event in the set of network event records, generating the prompt to reconfigure the security technology to prevent computer network traffic, analogous to the first data packet, on the target computer network.

16. The method of claim 1, wherein triggering storage of a data packet in local memory at a source agent for each data packet in the set of data packets comprises:
for each data packet in the set of data packets:
uploading the data packet to a source agent, assigned to the data packet, for storage in memory during an intermediate time between the first time period and the second time period.

17. The method of claim 1, wherein accessing a set of network event records comprises a log of network events published by the security technology during the second time period.

18. A method for emulating a known attack on a computer network comprising:
accessing a set of data packets representing data transmitted between machines in communication with a second computer network during a malicious attack on the second computer network during a first time period
accessing a set of agents, installed on assets in communication with a target computer network, assigned as actors in a simulation of the malicious attack on the target computer network;
for each data packet in the set of data packets:
assigning a transmission trigger, in a set of transmission triggers, for transmission of the data packet based on transmission of corresponding data during the malicious attack on the second computer network;
assigning a recipient agent, in the set of agents, to receive the data packet; and
assigning a source agent, in the set of agents, to transmit the data packet to the recipient agent according to the transmission trigger;
accessing a log of network events detected by a set of security technologies, deployed on the target computer network, during transmission of the set of data packets from source agents to recipient agents, in the set of agents, according to the set of transmission triggers that simulates the malicious attack on the target computer network; and
in response to absence of a network event, in the set of network events, indicating the malicious attack:
generating a prompt to reconfigure the set of security technologies to detect the malicious attack at the target computer network.

19. The method of claim 18, further comprising, for each data packet in the set of data packets:
uploading the data packet to a source agent, assigned to the data packet, for storage in memory during an intermediate time between the first time period and simulation of the malicious attack on the target computer network.

20. A method for emulating a known attack on a computer network comprising:
accessing a set of data packets representing behaviors of machines in communication with a second computer network during a malicious attack on the second computer network during a first time period
accessing a set of agents, installed on assets in communication with a target computer network, assigned as actors in a simulation of the malicious attack on the target computer network;
for each data packet in the set of data packets:
assigning a behavior trigger, in a set of behavior triggers, for transmission of the data packet based on a corresponding behavior during the malicious attack on the second computer network;
assigning a recipient agent, in the set of agents, to receive the data packet; and
assigning a source agent, in the set of agents, to transmit the data packet to the recipient agent according to the transmission trigger;
during a second time period succeeding the first time period, initiating transmission of the set of data packets from source agents to recipient agents, in the set of agents, according to the set of transmission triggers to simulate the malicious attack on the target computer network;
accessing a set of network event records generated by a security technology, deployed on the target computer network, during the second time period; and
in response to absence of a network event record, in the set of network event records, indicating the malicious attack:
generating a prompt to reconfigure the security technology to detect the malicious attack at the target computer network.

* * * * *